(12) United States Patent
Manwiller

(10) Patent No.: US 6,553,415 B1
(45) Date of Patent: Apr. 22, 2003

(54) SYSTEM FOR RESCHEDULING CASCADED CALLBACK FUNCTIONS TO COMPLETE AN ASYNCHRONOUS PHYSICAL LAYER INITIALIZATION PROCESS

(75) Inventor: Ryan D. Manwiller, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/471,724

(22) Filed: Dec. 23, 1999

(51) Int. Cl.[7] .......................... G06F 15/177; G06F 3/00
(52) U.S. Cl. ......................................... 709/222; 710/10
(58) Field of Search .................... 709/250, 100–108, 709/328; 340/825–825.02

(56) References Cited

U.S. PATENT DOCUMENTS

| | | | | |
|---|---|---|---|---|
| 5,430,876 A | * | 7/1995 | Schreiber et al. | 709/328 |
| 5,835,089 A | * | 11/1998 | Skarbo et al. | 709/328 |
| 5,845,140 A | * | 12/1998 | Stanley et al. | |
| 5,925,096 A | * | 7/1999 | Hlasnik et al. | 709/103 |
| 5,974,541 A | * | 10/1999 | Hall et al. | 709/108 |
| 6,012,081 A | * | 1/2000 | Dorn et al. | 709/102 |
| 6,065,073 A | * | 5/2000 | Booth | 709/203 |
| 6,115,813 A | * | 9/2000 | Hobson et al. | |
| 6,215,816 B1 | * | 4/2001 | Gillespie et al. | |
| 6,226,680 B1 | * | 5/2001 | Boucher et al. | 709/250 |
| 6,262,995 B1 | * | 7/2001 | Kwak | |
| 6,286,052 B1 | * | 9/2001 | McCloghrie et al. | 709/250 |
| 6,308,282 B1 | * | 10/2001 | Huang et al. | |

* cited by examiner

Primary Examiner—Le Hien Luu
Assistant Examiner—Quang N. Nguyen
(74) Attorney, Agent, or Firm—Pillsbury Winthrop LLP

(57) ABSTRACT

A method of asynchronous physical layer initialization. The method includes scheduling a callback function, wherein the callback function performs a function of the physical layer initialization process that requires a waiting period. Then, the callback function is executed. Next, at least one other system software code is executed when the callback function encounters the waiting period. Whether the callback function was completed is determined after at least one other system software code is executed. The callback function is rescheduled if the callback function was incomplete, and another callback function is scheduled if required to complete the physical layer initialization. These operations are repeated until callback functions are no longer required for the physical layer initialization process.

28 Claims, 4 Drawing Sheets

SYSTEM FOR RESCHEDULING CASCADED CALLBACK FUNCTIONS TO COMPLETE AN ASYNCHRONOUS PHYSICAL LAYER INITIALIZATION PROCESS

BACKGROUND OF THE INVENTION

1. Field of the Invention

The present invention relates to the field of computer network systems, and in particular, to a method and apparatus for asynchronous physical layer initialization performed by network adapter devices, such as an Ethernet card.

2. Background Information

Network-connected computers are common place today in many institutions, and even in homes with multiple computers. Among computer networks, the Ethernet is a popular option for establishing the network connections. The Ethernet sends its communications through radio frequency signals carried by a coaxial cable. Each computer connected to the Ethernet checks to see if another computer is transmitting and waits its turn to transmit. If two computers accidentally transmit at the same time and their messages collide, they wait and send again in turn. Software protocols used by Ethernet systems vary, but include Novell Netware and TCP/IP.

As with the initialization of most computer systems, an operating system is typically first loaded. Software drivers are then executed in order to operate the various hardware components installed on the system, such as sound cards, video cards, printers, and network adapters. Software drivers for a network adapter, like all software programs, require memory resources and take up a certain amount of time to load into memory.

The primary architectural model for network computing is the Open Systems Interconnection (OSI) reference model. The OSI model divides the tasks involved with moving information between networked computers into seven smaller, more manageable task groups. A task or group of tasks is then assigned to each of the seven OSI layers. Each layer is reasonably self-contained, so that the tasks assigned to each layer can be implemented independently. This independence allows the solutions offered by one layer to be updated without adversely affecting the other layers. The seven OSI model layers are: (1) the physical layer; (2) the data link layer; (3) the network layer; (4) the transport layer; (5) the session layer; (6) the presentation layer; and (7) the application layer.

The physical layer is related to the transmission of data over a medium. The data link layer relates to the packaging and transfer of packets of data. The network layer is related to routing packets, for example, over a wide-area network (WAN). The transport layer ensures that the data is delivered reliably, having functionality for flow control, multiplexing, virtual circuit management, and error checking and recovery. The session layer establishes, manages, and terminates the communication links over a network (between presentation layer entities). The presentation layer performs the code conversion for data presentation. Finally, the application layer performs the specialized user functions and interacts with the software applications that implement a communicating component. The application layer functions typically include identifying communication partners, determining resource availability, and synchronizing communication.

When a computer system is turned on, the operating system is generally first booted onto the system. Once the operating system takes control, software drivers for each hardware component (e.g., the video card, sound card, printer, network adapter, etc.) system must be loaded and initialized. When the network adapter driver is initializing the network adapter, the physical layer of the network adapter is usually initialized synchronously. That is, the physical layer initialization process performs a series of operations one at a time to prepare the computer system for connection to a network through the network adapter. However, during the physical layer initialization process, many operations are performed in software in order to work around any hardware issues that may present themselves. In order for the operations to work around the hardware issues, many of the operations involve a waiting period, such as reading from or writing to specific registers and then waiting for a specified amount of time. In such a process, time is wasted because all of the other software drivers of the computer system are blocked from execution until the entire physical layer initialization process is completed. Therefore, there is a substantial amount of "wasted" time when all of the other software drivers are blocked from execution. Accordingly, a faster and more efficient boot and initialization of a computer system is desirable.

SUMMARY OF THE INVENTION

According to an embodiment of the present invention, a method of asynchronous physical layer initialization includes scheduling a callback function. The callback function is used to perform functions of the physical layer initialization process that requires a waiting period. At least one other system software function is executed when the callback function encounters a waiting period. Whether the callback function was completed is determined after the at least one other system software function is executed. The callback function is rescheduled if the task of the callback function was not completed, and another callback function is scheduled if required to complete the physical layer initialization process. The above operations are repeated until callback functions are no longer required for the physical layer initialization process.

DETAILED DESCRIPTION OF THE INVENTION

Figure 1:
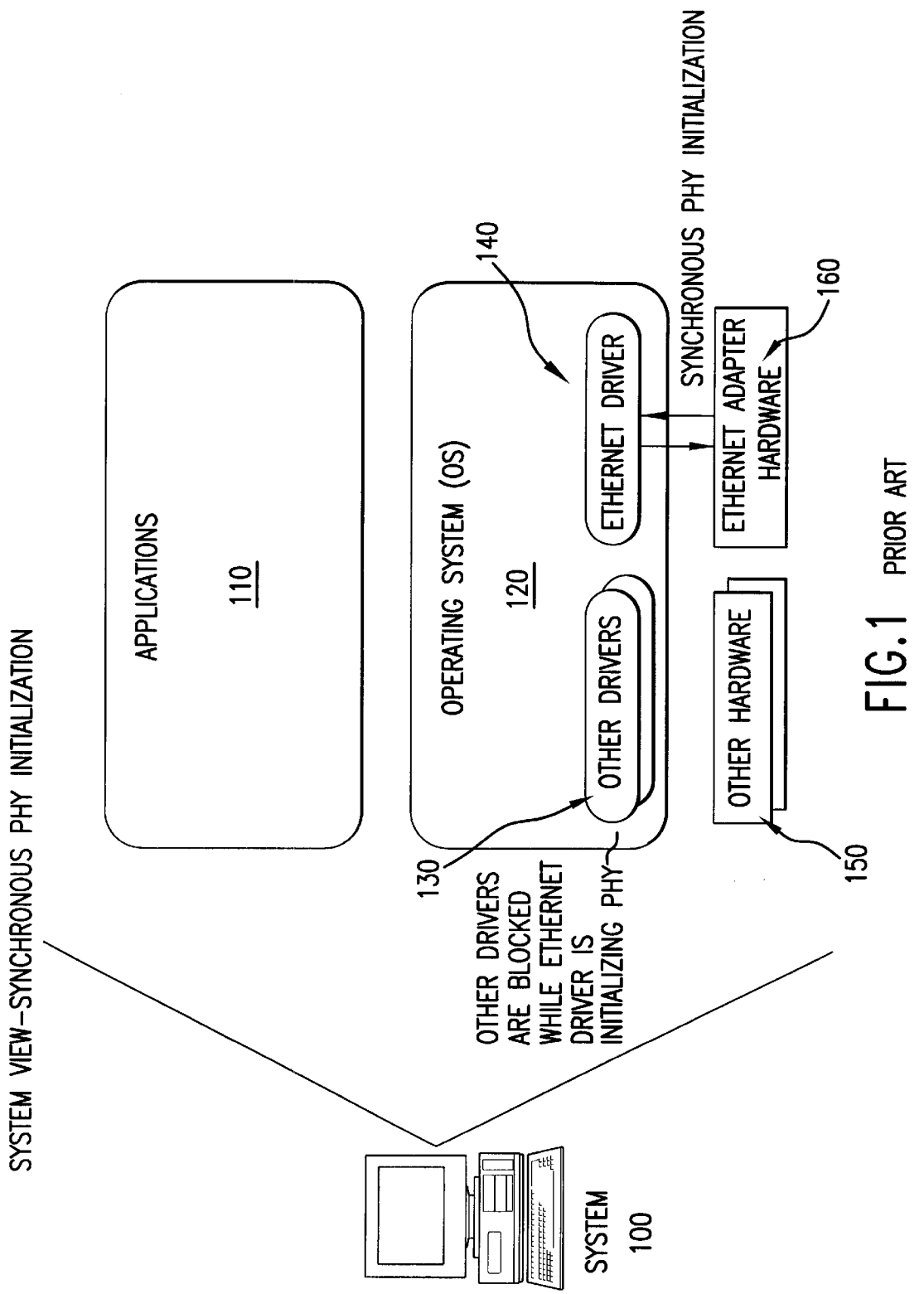
FIG. 1 illustrates a system view diagram of a prior art synchronous physical layer initialization process.

FIG. 1 illustrates a system view diagram of a prior art synchronous physical layer initialization process. An operating system 120 resides on a computer system 100, along with other application programs 110. Connected to the computer system 100 are usually other hardware components 150, such as a printer, a video card, a sound card, a modem, etc. Additionally, the computer system 100 may be connected to a network by a network adapter device 160, such as an Ethernet adapter card. The Ethernet adapter card enables the computer system 100 to connect to an Ethernet.

The Ethernet adapter card is usually a printed circuit board that is plugged into the computer system 100. However, the Ethernet adapter card may also be integrated on the system board. The Ethernet cards are typically connected to each other by cables. The Ethernet adapter card may be, for example, an Ethernet PCI-bus adapter, which connects to the computer system 100 by inserting the computer connection member end of the Ethernet adapter card into the PCI-slot of the computer system 100. The Ethernet PCI-bus adapter has a network connection member, such as an RJ-45 port, for receiving a cable for connection to a receiving device, such as a hub, repeater, or directly into another computer system to establish the network connection.

When the computer system 100 is initially powered on, the operating system 120 is booted onto the computer system 100. The operating system 120 then takes control to boot and load the various software drivers 130, 140 required to operate the various hardware components 150, 160 connected to the computer system 100. Typically, the network driver 140, such as an Ethernet driver for an Ethernet adapter card, is first executed for synchronous physical layer initialization to prepare the network adapter 160 for connecting the computer system 100 to the network. However, during physical layer initialization by the network driver 140, all other system software drivers 130 (the video card driver, the sound card driver, the modem driver, the printer driver, etc.) are suspended from execution until the physical layer initialization of the network adapter 160 is complete.

Figure 2:
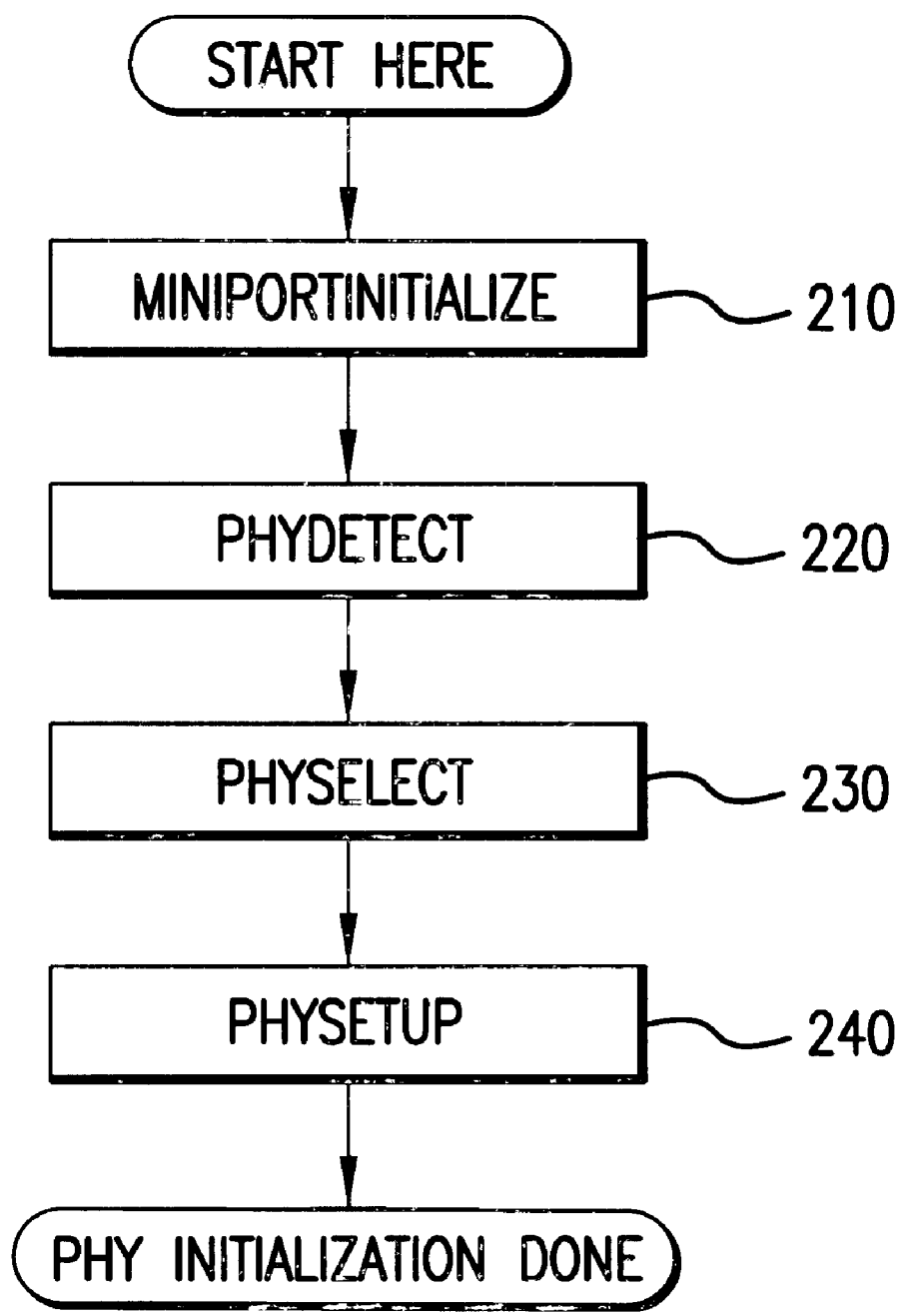
FIG. 2 illustrates a flow chart of a prior art synchronous physical layer initialization process.

FIG. 2 illustrates a flow chart of a prior art synchronous physical layer initialization process. Typically, the first operation 210 of the synchronous physical layer initialization process is to initialize the miniport. The "MiniportInitialize" operation 210 is the entry point for initializing the device driver corresponding to the network adapter, such as the Ethernet adapter card. All aspects of the network adapter initialization process, including physical layer initialization, are carried out from this first "MiniportInitialize" operation 210. The physical layer initialization process is first started by the function in operation 220, "PhyDetect". The "PhyDetect" operation 220 is responsible for determining which physical layer address to utilize. The physical layer addresses, typically from 0–32, are scanned to locate a valid physical layer address. A valid physical layer address is one which has a network link, and it is determined by reading the physical layer hardware registers.

Once a valid physical layer address is located, the next operation 230, "PhySelect", aids in the physical layer selection process. That is, the "PhySelect" operation 230 is responsible for issuing commands to electrically isolate all of the physical layer addresses, except for the selected physical layer address. The "PhySelect" operation 230 generally utilizes an inline "busy wait" loop for up to 3.5 seconds while the auto-negotiation process completes. This causes the other parts of the operating system initialization processes to be suspended and delayed during this time. Auto-negotiation is a function that allows two devices at either end of a link segment to negotiate common data service functions. When auto-negotiation is completed, the final operation of the physical layer initialization process, the "PhySetup" operation 240, is performed. The "PhySetup" operation 240 is responsible for setting the proper speed and duplex of the network connection, if it was not set via auto negotiation. Additionally, the "PhySetup" operation 240 executes any codes specific to each physical layer model, as well any software "workarounds" that may be required to provide functionality to the hardware, such as an ACPI workaround (see Advanced Configuration and Power Management Interface Specification, Revision 1.0b, Feb. 2, 1999, by Intel, Microsoft, and Toshiba), a squelch workaround, and an equalizer workaround. Generally, these software workarounds also require "busy-waiting" for completion, causing the other parts of the operating system initialization process to be suspended and delayed. Once the "PhySetup" operation 240 is completed, the synchronous physical layer initialization process is completed, and the operating system may carry out the remainder of its functions, such as executing the other drivers for the hardware connected to the computer system to properly boot the computer system for user operation.

Figure 3:
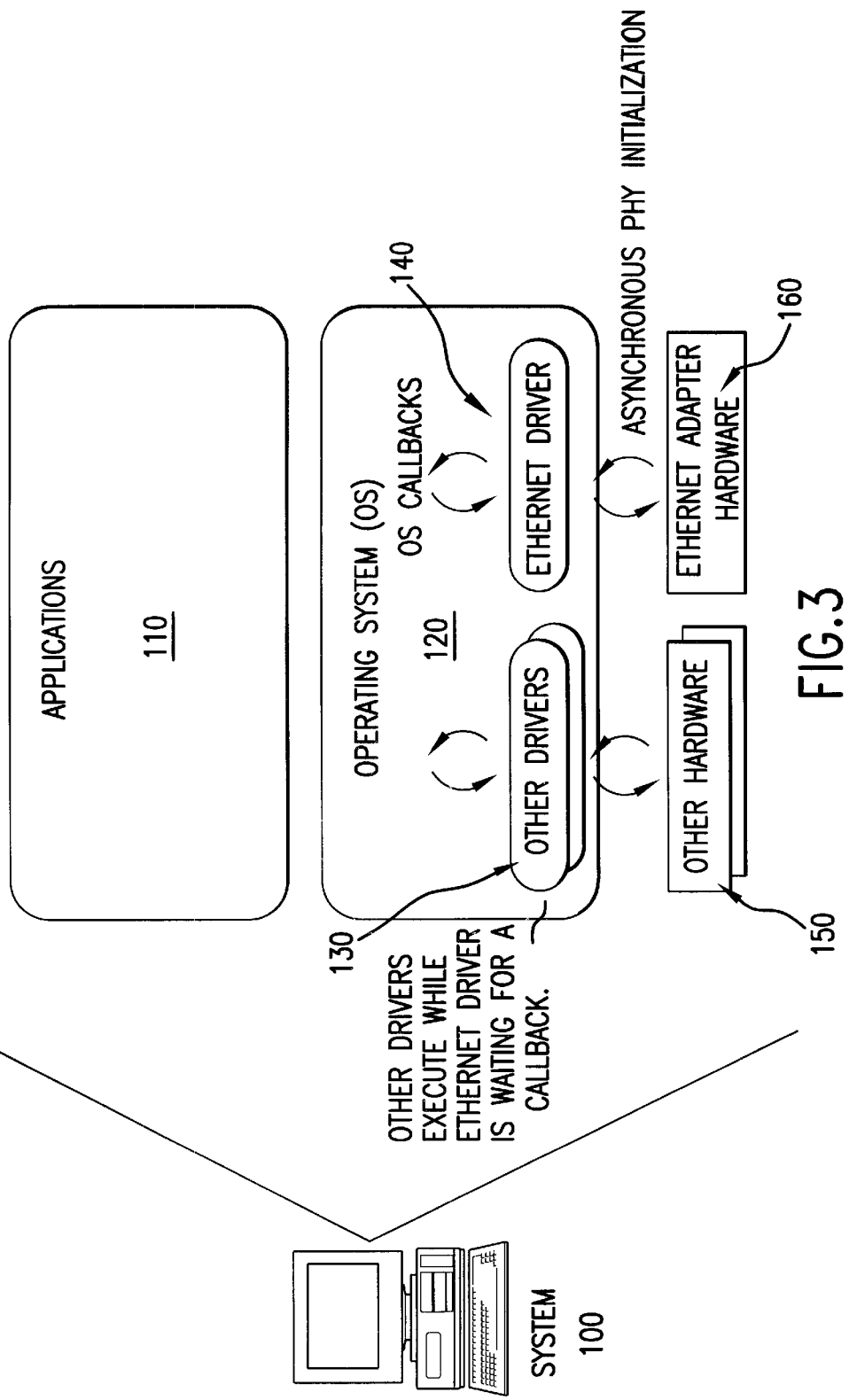
FIG. 3 illustrates a system view diagram of an asynchronous physical layer initialization process according to an embodiment of the present invention.

FIG. 3 illustrates a system view diagram of an asynchronous physical layer initialization process according to an embodiment of the present invention. Utilization of an asynchronous physical layer initialization process allows the other system drivers 130 to be executed while the network driver 140 is performing a physical layer initialization function that requires a waiting/delay period. According to a preferred embodiment of the present invention, the asynchronous physical layer initialization process is performed by a NDIS (see Network Device Interface Specification 5.0, December 1998, by Microsoft) compatible software driver executed by the processor at the direction of the operating system of the computer, which enables a single network adapter (such as an Ethernet adapter card) to support multiple network protocols.

In the asynchronous physical layer initialization process according to an embodiment of the present invention, the initialization process is broken down into smaller callback functions. Each callback function is a section of the physical layer initialization code that may be executed at a later time, allowing the physical layer initialization process to be completed asynchronously, and interleave other system initialization operations in between the callback functions. Preferably, the functions of the physical layer initialization process that are selected as callback functions are those functions where a waiting/delay period occurs. Therefore, once the physical layer initialization process is started, the physical layer initialization process is postponed to a sequence of callback functions, making the flow of physical layer initialization functions asynchronous with respect to the remainder of the network adapter 160 driver initialization.

The callback functions are preferably cascaded. That is, the currently executing callback function may schedule the next callback function to be executed (including the same callback function if it was not completed). Therefore, the time between the execution of the current callback function and the next scheduled callback function may be used to load and execute other system software codes/drivers onto the computer system 100. This is opposed to the prior art synchronous physical layer initialization process, where the other system software codes are executed only after the entire physical layer initialization process has been completed. The use of an asynchronous physical layer initialization process according to an embodiment of the present invention is more efficient, saving valuable time in the boot/initialization of a computer system 100 having a network adapter 160, as compared to prior art synchronous physical layer initialization processes.

Figure 4:
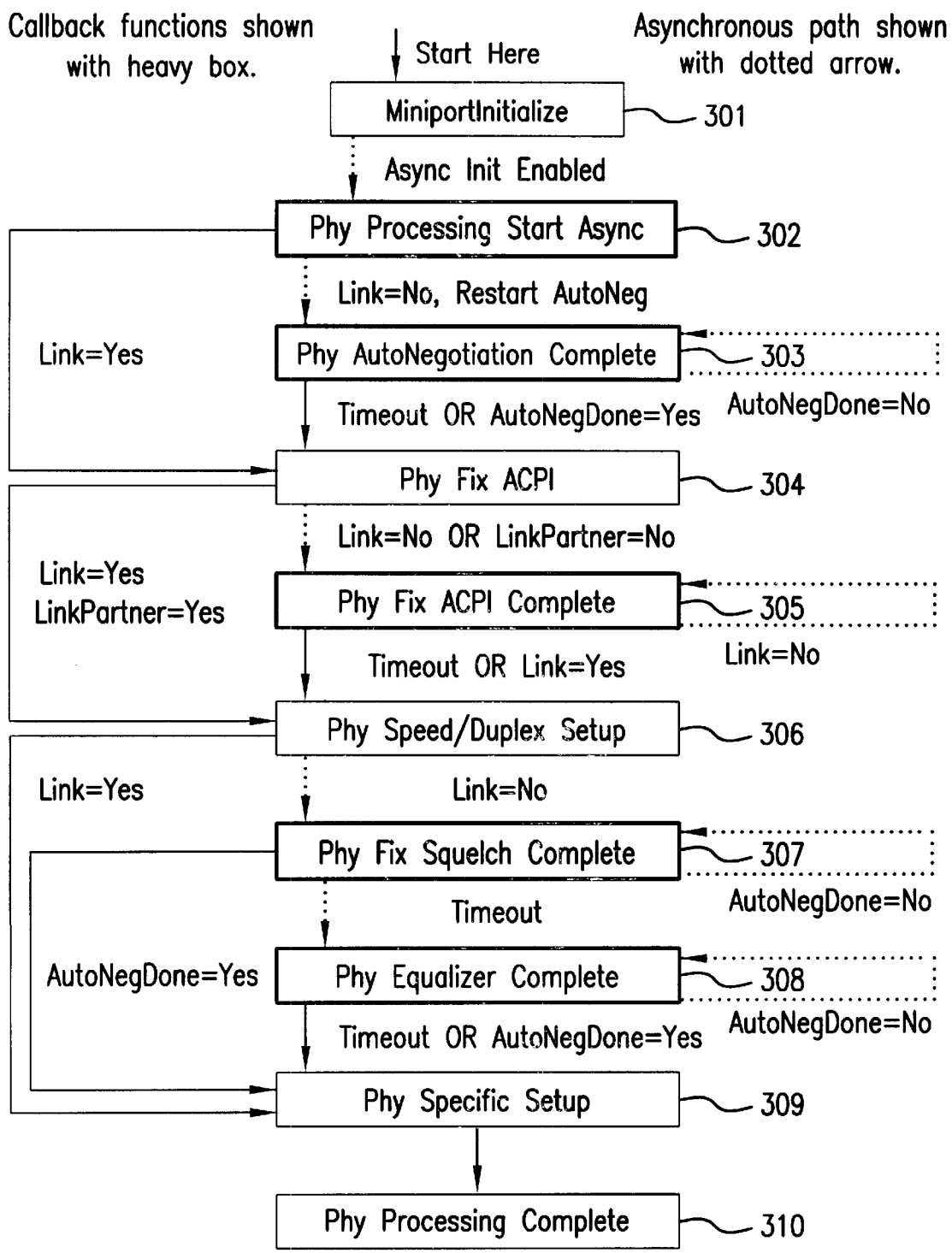
FIG. 4 illustrates a flow chart of an asynchronous physical layer initialization process according to an embodiment of the present invention.

FIG. 4 illustrates a flow chart of an asynchronous physical layer initialization process according to an embodiment of the present invention. The "MiniportInitialize" operation 301 is the entry point for initializing the device driver corresponding to a network adapter 160, such as an Ethernet adapter card. The actual asynchronous physical layer initialization process begins at the end of the "MiniportInitialize" operation 301, when the first callback function is scheduled. That is, as far as the operating system 120 is concerned, the "MiniportInitialize" operation 301 is completed and the operating system 120 is free to continue initializing the rest of the system.

In the next operation according to an embodiment of the present invention, the "Phy Processing StartAsync" operation 302 is the first function that may be scheduled as a callback function. The "Phy Processing StartAsync" operation 302 is the callback function responsible for electrically isolating all of the physical layer addresses, except for the selected physical layer address. Once this process is complete, if the selected physical layer address has a network link, the physical layer initialization process preferably proceeds to the "Phy Fix ACPI" operation 304. If there is no network link present in the selected physical layer address, then auto-negotiation is restarted, and the next callback function is scheduled.

The "Phy AutoNegotiation Complete" operation 303 may be the next scheduled callback function. The "Phy AutoNegotiation Complete" operation 303 is the callback function responsible for checking for the completion of auto-negotiation. Auto-negotiation is a function that allows two devices at either end of a link segment to negotiate common data service functions. More specifically, auto-negotiation is a mechanism that takes control of the cable when a connection is established to a network device. Auto-negotiation detects the various modes that exist in the device on the other end of the wire, the link partner, and advertises its own abilities to automatically configure the highest performance mode of interoperation. Once auto-negotiation has received the link partner's abilities in a robust manner and it receives acknowledgement that its abilities have also been received by the link partner, auto-negotiation compares the two sets of abilities and decides which technology to connect. This decision is based upon a pre-agreed priority of technologies. Auto-negotiation can provide automatic speed matching for multi-speed devices at each end of a link. Auto-negotiation may also sense other capabilities, such as whether a device supports full duplex operation. Auto-negotiation allows simple, automatic connection of devices that support a variety of modes from a variety of manufacturers. If auto-negotiation is complete, or if a timeout has been reached, the next operation of the asynchronous physical layer initialization process is performed. Otherwise, this callback function may be re-scheduled again for execution until it is completed or until a timeout occurs. The scheduling mechanism is an operating system API, which allows the software driver to specify a function to be called back after a given interval has lapsed. The function that is specified is a callback function that performs a physical layer initialization or a workaround. During the given internal, other operating system instructions or driver instructions outside of the network driver will be executed.

The next operation of the asynchronous physical layer initialization process according to an embodiment of the present invention may be the "Phy Fix ACPI" operation 304. The "Phy Fix ACPI" operation 304 applies the ACPI (Advanced Configuration and Power Management Interface) software workaround. That is, power management routines are implemented for interfaces between the operating system software, the hardware, and the BIOS software. The ACPI software workaround provides functionality to perform fixes that allows the hardware to function properly on certain ACPI-based operating systems. The ACPI workaround allows the hardware to properly handle the ACPI-state transitions from powered-on to powered-off, and back to the powered-on state. The ACPI workaround is not applied until the system is powered back up. Once the "Phy Fix ACPI" operation 304 is completed, other callback functions may be scheduled, if required. In this particular instance, if a network link has not been established or a link partner has not been established, then the "Phy Fix ACPI Complete" callback function, at operation 305, may be scheduled. However, the "Phy Fix ACPI Complete" callback function may be skipped if a network link has been established and the link partner has been established.

The "Phy Fix ACPI Complete" operation 305 is a callback function that checks for the establishment of a network link and the completion of the ACPI software workaround. If a network link is established, or a timeout occurs, the next operation in the physical layer initialization process may be performed. Otherwise, this same callback function may be rescheduled again until the ACPI workaround is completed.

Once the network link is established, the "Phy Speed/Duplex Setup" operation 306 of the asynchronous physical layer initialization process may be performed. The "Phy Speed/Duplex Setup" operation 306 performs the setup of the speed and duplex of the network connection. If a network link has still not yet been established, the next callback function may be scheduled.

The "Phy Fix Squelch Complete" operation 307 is a callback function that may be scheduled if a network connection has not yet been established in the "Phy Speed/Duplex Setup" operation 306. The "Phy Fix Squelch Complete" operation 307 performs the squelch software workaround and checks for completion of the auto-negotiation process. The squelch software workaround performs, for example, the function of discriminating link test pulses and data from random noise (i.e., reducing the background noise). The squelch workaround is required to decrease the sensitivity to noise on the wire, which allows it to establish a link where it was not possible without this workaround. Unless a timeout is reached, this same callback function may be rescheduled until auto-negotiation is completed.

If a timeout has occurred in the "Phy Fix Squelch Complete" operation 307, and auto-negotiation was not completed, the next callback function that may be scheduled is the "Phy Fix Equalizer Complete" operation 308. The "Phy Fix Equalizer Complete" operation 308 performs the equalizer software workaround and checks for completion of the auto-negotiation process. The equalizer software workaround is performed if the squelch software workaround is unsuccessful. In the equalizer software workaround, the equalizer configuration is adjusted differently in a final attempt to establish a connection. Once the auto-negotiation process is complete, or if a timeout has occurred, the physical layer initialization process may proceed to the next operation. If not, then this same callback function may be rescheduled.

The next operation in the asynchronous physical layer initialization process of an embodiment of the present invention is the "Phy Specific Setup" operation 309. The "Phy Specific Setup" operation 309 performs the physical layer model specific setup, and then proceeds to the final operation in the physical layer initialization process.

The final operation of the asynchronous physical layer initialization process according to an embodiment of the present invention is the "Phy Processing Complete" operation 310. The "Phy Processing Complete" operation 310 performs the final processing for the physical layer initialization process, such as indicating link status to the operating system, starting runtime timers, and enabling adapter interrupts, etc.

Once the asynchronous physical layer initialization process is completed, the operating system 120 regains full control of the resources of the computer system 100 and may continue to execute any software codes still required to initialize/boot the computer system 100. The use of an asynchronous physical layer initialization process according to the present invention is more efficient, saving valuable time in the boot/initialization of a computer system 100 having a network adapter 160, as compared to prior art synchronous physical layer initialization processes.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of asynchronous physical layer initialization, the method comprising:
    (a) scheduling a callback function, the callback function performing a function of the physical layer initialization that requires a waiting period;
    (b) executing the callback function;
    (c) executing at least one other system software code while the physical layer initialization is still being conducted when the callback function encounters the waiting period;
    (d) determining whether the callback function was completed after the at least one other system software code is executed;
    (e) re-scheduling the callback function if the callback function was incomplete;
    (f) scheduling another callback function if required to complete the physical layer initialization; and
    (g) repeating operations (b) to (f) until callback functions are no longer required for the physical layer initialization.

2. The method according to claim 1, wherein the callback function isolates all physical layer addresses except a selected physical layer address.

3. The method according to claim 1, wherein the callback function performs an auto-negotiation process.

4. The method according to claim 1, wherein the callback function performs an ACPI (advanced configuration and power management interface) software workaround.

5. The method according to claim 1, wherein the callback function performs a squelch software workaround.

6. The method according to claim 1, wherein the callback function performs an equalizer software workaround.

7. An apparatus for establishing a computer network connection utilizing asynchronous physical layer initialization, the apparatus comprising:
    a computer connection member for connecting the apparatus to a computer system;
    a network connection member for connecting the apparatus to a network;
    a processor; and
    a software driver adapted to be executed by the processor at direction of an operating system of the computer system for operation of the apparatus, the software driver including,
        instructions for scheduling a callback function, the callback function performing a function of the physical layer initialization that requires a waiting period,
        instructions for executing the callback function,
        instructions for determining whether the callback function was completed after at least one other system software code is executed while the physical layer initialization is still being conducted,
        instructions for rescheduling the callback function if the callback function was incomplete, and
        instructions for scheduling another callback function if required to complete the physical layer initialization.

8. The apparatus according to claim 7, wherein the callback function isolates all physical layer addresses except a selected physical layer address.

9. The apparatus according to claim 7, wherein the callback function performs an auto-negotiation process.

10. The apparatus according to claim 7, wherein the callback function performs an ACPI (advanced configuration and power management interface) software workaround.

11. The apparatus according to claim 7, wherein the callback function performs a squelch software workaround.

12. The apparatus according to claim 7, wherein the callback function performs an equalizer software workaround.

13. The apparatus according to claim 7, wherein the software driver is an NDIS (network device interface specification) miniport driver.

14. A computer system comprising:
    a network adapter connected to the computer system;
    an operating system executing on the computer system; and
    a software driver adapted to be executed by a processor at direction of the operating system for operation of the network adapter, the software driver including,
        instructions for scheduling a callback function, the callback function performing a function of physical layer initialization that requires a waiting period,
        instructions for executing the callback function,
        instructions for determining whether the callback function was completed after at least one other system software code is executed while the physical layer initialization is still being conducted,
        instructions for rescheduling the callback function if the callback function was incomplete, and
        instructions for scheduling another callback function if required to complete the physical layer initialization.

15. The computer system according to claim 14, wherein the callback function isolates all physical layer addresses except a selected physical layer address.

16. The computer system according to claim 14, wherein the callback function performs an auto-negotiation process.

17. The computer system according to claim 14, wherein the callback function performs an ACPI (advanced configuration and power management interface) software workaround.

18. The computer system according to claim 14, wherein the callback function performs a squelch software workaround.

19. The computer system according to claim 14, wherein the callback function performs an equalizer software workaround.

20. The computer system according to claim 14, wherein the network adapter is an Ethernet adapter.

21. The computer system according to claim 14, wherein the software driver is an NDIS (network device interface specification) miniport driver.

22. A computer program system for asynchronous physical layer initialization, the computer program system comprising:
- a computer-readable medium; and
- computer-readable program code, stored on the computer-readable medium, adapted to be loaded and executed on an operating system of a computer system for operation of a network adapter, the computer-readable program code performing,
  - scheduling a callback function, the callback function performing a function of the physical layer initialization that requires a waiting period,
  - executing the callback function,
  - determining whether the callback function was completed after at least one other system software code is executed while the physical layer initialization is still being conducted,
  - rescheduling the callback function if the callback function was incomplete, and
  - scheduling another callback function if required to complete the physical layer initialization.

23. The computer program system according to claim 22, wherein the callback function isolates all physical layer addresses except a selected physical layer address.

24. The computer program system according to claim 22, wherein the callback function performs an auto-negotiation process.

25. The computer program system according to claim 22, wherein the callback function performs an ACPI (advanced configuration and power management interface) software workaround.

26. The computer program system according to claim 22, wherein the callback function performs a squelch software workaround.

27. The computer program system according to claim 22, wherein the callback function performs an equalizer software workaround.

28. The computer program system according to claim 22, wherein the computer-readable program code is an NDIS (network device interface specification) miniport software driver.

* * * * *